United States Patent
Koga (10) Patent No.: US 10,763,558 B2
(45) Date of Patent: Sep. 1, 2020

(54) BATTERY INCLUDING THERMAL-EXPANDABLE LAYER BETWEEN PAIR OF CURRENT COLLECTORS, AND BATTERY STACK

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 16/152,414

(22) Filed: Oct. 5, 2018

(65) Prior Publication Data

US 2019/0131676 A1     May 2, 2019

(30) Foreign Application Priority Data

Oct. 31, 2017   (JP) ................... 2017-211351

(51) Int. Cl.
*H01M 10/00*      (2006.01)
*H01M 10/659*     (2014.01)
*H01M 4/66*       (2006.01)
*H01M 10/04*      (2006.01)
*H01M 10/0525*    (2010.01)

(52) U.S. Cl.
CPC ........... *H01M 10/659* (2015.04); *H01M 4/66* (2013.01); *H01M 4/665* (2013.01); *H01M 4/668* (2013.01); *H01M 10/0413* (2013.01); *H01M 10/0436* (2013.01); *H01M 10/0525* (2013.01)

(58) Field of Classification Search
CPC ............. H01M 4/665; H01M 10/0436; H01M 10/0413; H01M 4/66; H01M 4/668
See application file for complete search history.

(56) References Cited

U.S. PATENT DOCUMENTS

| | | | |
|---|---|---|---|
| 2008/0254355 A1 | 10/2008 | Muraoka et al. | |
| 2015/0118553 A1 | 4/2015 | Kato et al. | |
| 2016/0028050 A1* | 1/2016 | Shiraishi | H01M 2/024 429/57 |

FOREIGN PATENT DOCUMENTS

| | | |
|---|---|---|
| JP | 2008-262785 | 10/2008 |
| JP | 2008-300138 | 12/2008 |
| JP | 2010-287549 | 12/2010 |
| JP | 2016-076359 | 5/2016 |
| JP | 2016-126901 | 7/2016 |
| JP | 2017-037780 | 2/2017 |
| WO | 2013/172257 | 11/2013 |

* cited by examiner

*Primary Examiner* — Cynthia H Kelly
*Assistant Examiner* — Monique M Wills
(74) *Attorney, Agent, or Firm* — McDermott Will & Emery LLP (57) ABSTRACT

A battery includes a first current collector, a laminate disposed on a first region of a surface of the first current collector, a thermal-expandable layer disposed on a second region of the surface of the first current collector, and a second current collector disposed on both of the laminate and the thermal-expandable layer. The laminate includes a first active material layer disposed on the first region, an electrolyte layer disposed on the first active material layer, and a second active material layer disposed on the electrolyte layer. A thermal expansion ratio of the thermal-expandable layer is greater than a thermal expansion ratio of the laminate.

15 Claims, 4 Drawing Sheets

BATTERY INCLUDING THERMAL-EXPANDABLE LAYER BETWEEN PAIR OF CURRENT COLLECTORS, AND BATTERY STACK

BACKGROUND

1. Technical Field

The present disclosure relates to a battery and a battery stack.

2. Description of the Related Art

Batteries, in some cases, suddenly generate heat when, for example, short-circuiting occurs. A technology for suppressing such an increase in battery temperature is disclosed in, for example, Japanese Unexamined Patent Application Publication No. 2016-126901, which relates to an all-solid-state battery. The all-solid-state battery includes a coating layer including a thermally expandable resin on a recessed non-contact surface of the positive electrode current collector. In addition, Japanese Unexamined Patent Application Publication No. 2008-262785 discloses a battery including an expandable member. In addition, International Publication No. WO2013/172257 discloses a battery in which an electroconductive thermosetting resin layer is formed on a current collector.

SUMMARY

In one general aspect, the techniques disclosed here feature a battery. The battery includes: a first current collector having a surface; a laminate disposed on a first region of the surface of the first current collector; a thermal-expandable layer disposed on a second region of the major surface of the first current collector; and a second current collector disposed on both of the laminate and the thermal-expandable layer. The laminate includes: a first active material layer disposed on the first region; an electrolyte layer disposed on the first active material layer; and a second active material layer disposed on the electrolyte layer. The thermal expansion ratio of the thermal-expandable layer is greater than the thermal expansion ratio of the laminate.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Definition of Terms

In the present disclosure, the phrase "B disposed on A" indicates a relative positional relationship between A and B, and thus the positional relationship is not limited by the orientation of the battery during manufacture, when being sold, or during use.

In the present disclosure, the phrase "D in contact with C" means C and D are in direct contact with each other or C and D are in contact with each other with an adhesive (e.g., electroconductive adhesive) disposed therebetween.

In the present disclosure, the phrase "bonding strength between E and F" is not limited to the form in which E and F are directly bonded to each other and includes forms in which E and F are bonded to each other with an adhesive (e.g., electroconductive adhesive) disposed therebetween.

In the present disclosure, "first" and "second" are indications used for convenience in order to distinguish similar components and are not intended to limit the components to a particular order, such as order of manufacturing. "Fist" and "second" can be interpreted as interchangeable.

Overview of Embodiments

An overview of one aspect of the present disclosure is as follows.

According to one aspect of the present disclosure, a battery includes a first electrode layer, a second electrode layer that is a counter electrode to the first electrode layer, an electrolyte layer, and a first thermal-expandable layer. In the battery, the first electrode layer includes a first current collector and a first active material layer disposed on the first current collector, the second electrode layer includes a second current collector and a second active material layer disposed on the second current collector, the electrolyte layer is disposed between the first active material layer and the second active material layer and is in contact with the first active material layer and the second active material layer, the first thermal-expandable layer is disposed between the first current collector and the second current collector and is in contact with the first current collector and the second current collector, and, when the first thermal-expandable layer thermally expands, the first thermal-expandable layer increases a distance between the first current collector and the second current collector to separate the electrolyte layer and the second active material layer from each other.

With this configuration, the first thermal-expandable layer thermally expands in the case that anomalous heat generation occurs in the battery, and consequently electrical current can be interrupted. Thus, anomalous heat generation in the battery is suppressed, which suppresses the battery from catching fire or emitting smoke.

In addition, according to another aspect of the present disclosure, a stacked battery includes a first battery, the first battery being the above-described battery, a second battery, and a second thermal-expandable layer disposed between the first battery and the second battery. In the stacked battery, when the second thermal-expandable layer thermally expands, the second thermal-expandable layer increases a distance between the first battery and the second battery to separate the first battery and the second battery from each other.

For example, in the stacked battery according to another aspect of the present disclosure, the first battery and the second battery may be disposed in such a manner that an electrode terminal of the first battery and an electrode terminal of the second batter are in contact with each other, and, when the second thermal-expandable layer thermally expands, the second thermal-expandable layer may increase a distance between the electrode terminal of the first battery and the electrode terminal of the second battery to separate the electrode terminal of the first battery and the electrode terminal of the second battery from each other.

With this configuration, the second thermal-expandable layer thermally expands in the case that anomalous heat generation occurs in a battery included in the stacked battery, and consequently electrical current can be interrupted. Thus, anomalous heat generation in the battery is suppressed, which suppresses a battery adjacent to the battery experiencing anomalous heat generation from catching fire. Thus, the stacked battery is suppressed from catching fire or emitting smoke.

Now, embodiments will be described specifically with reference to the drawings.

The embodiments described below are all generic or specific examples. The values, shapes, materials, constituent components, and placement positions and forms of connection of the constituent components, presented in the embodiments below, are examples and not intended to limit the present disclosure. Of the constituent components in the embodiments described below, constituent components not recited in any of the independent claims that indicate the broadest concept will be described as optional constituent components.

In addition, the drawings may not necessarily be accurate representations. In the drawings, substantially the same components are assigned the same reference signs, and redundant descriptions thereof will be omitted or simplified.

Embodiments

Overview of Battery

First, a battery according to the present embodiment will be described.

Figure 1:
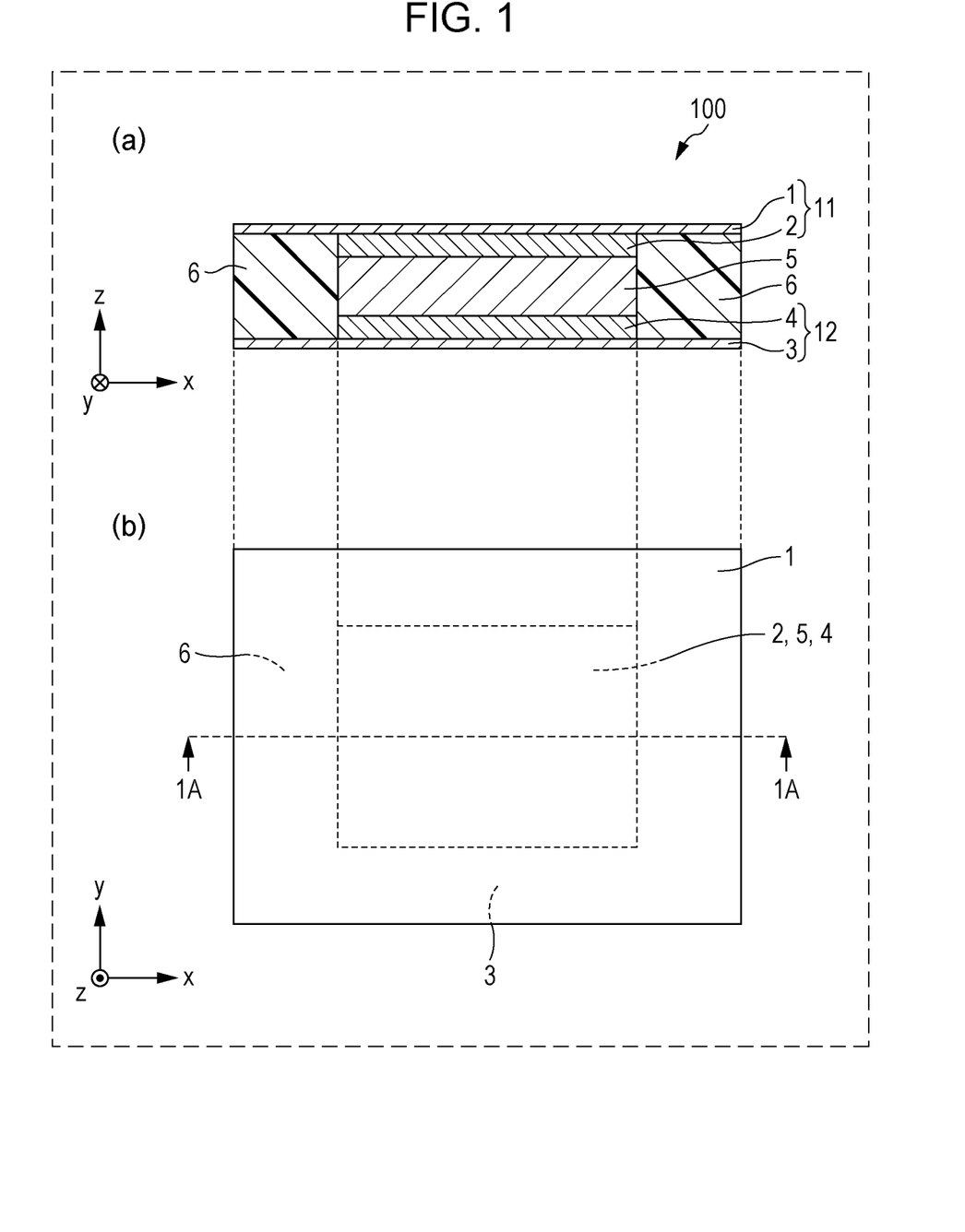
FIG. 1 is a diagram illustrating a configuration of a battery according to an embodiment.

FIG. 1 is a diagram illustrating a configuration of a battery 100, according to the present embodiment. In FIG. 1, the upper figure (a) is a schematic cross-sectional view of the battery 100, and the lower figure (b) is a top view of the battery 100. Line 1A-1A, illustrated in the lower figure, is a cross-section line.

Figure 2:
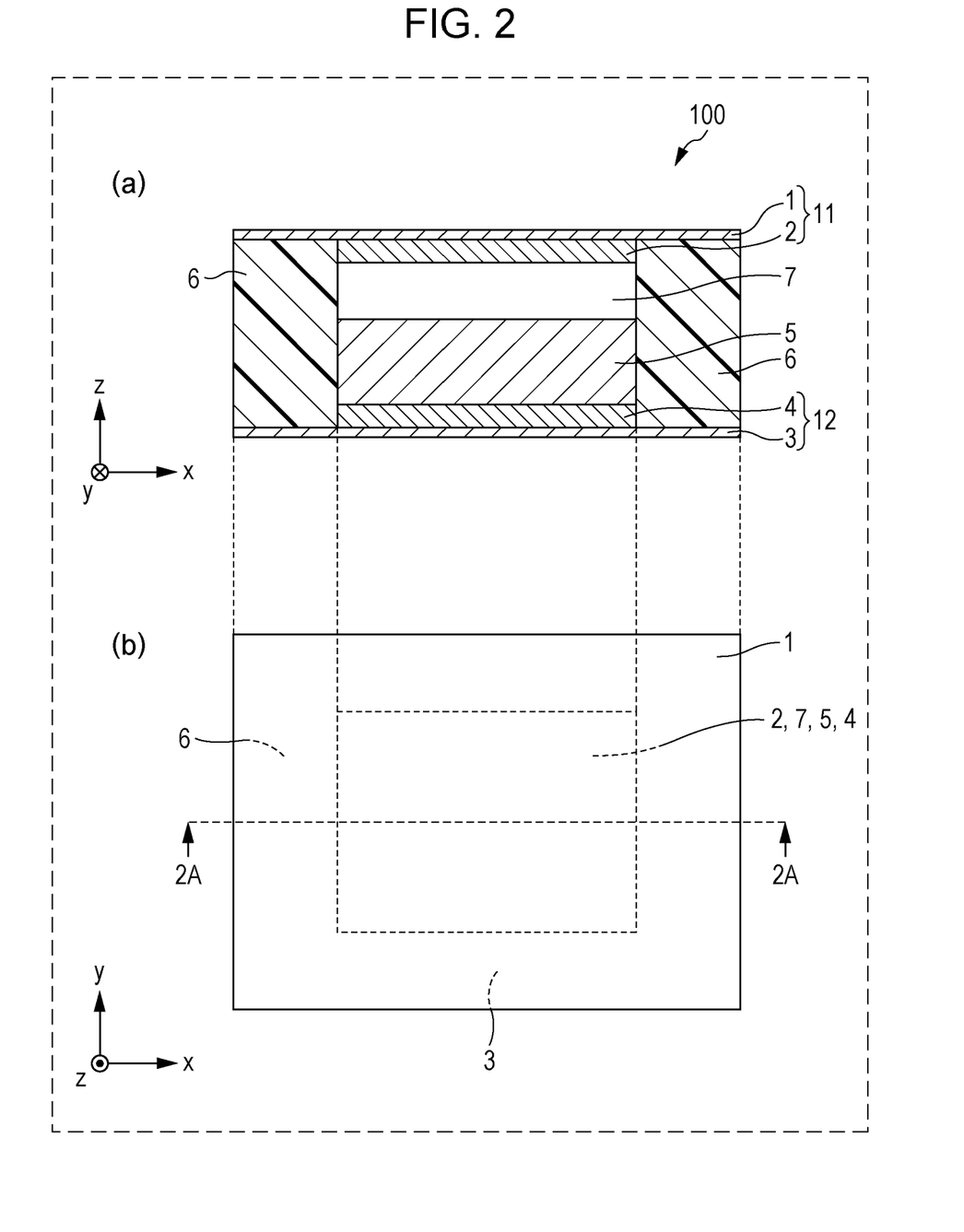
FIG. 2 is a diagram illustrating a change that occurs when the battery according to the embodiment generates heat.

FIG. 2 is a diagram illustrating a change that occurs when the battery 100 according to the present embodiment generates heat. In FIG. 2, the upper figure (a) is a schematic cross-sectional view of the battery 100 when the battery 100 generates heat, and the lower figure (b) is a top view of the battery 100. Line 2A-2A, illustrated in the lower figure, is a cross-section line.

As illustrated in FIG. 1, the battery 100 according to the present embodiment includes a first electrode layer 12, a second electrode layer 11, an electrolyte layer 5, and a first thermal-expandable layer 6. The second electrode layer 11 is a counter electrode to the first electrode layer 12.

The first electrode layer 12 includes a first current collector 3 and a first active material layer 4, which is disposed on the first current collector 3. The second electrode layer 11 includes a second current collector 1 and a second active material layer 2, which is disposed on the second current collector 1. The electrolyte layer 5 is disposed between the first active material layer 4 and the second active material layer 2 and is in contact with the first active material layer 4 and the second active material layer 2.

The first thermal-expandable layer 6 is disposed between the first current collector 3 and the second current collector 1 and is in contact with the first current collector 3 and the second current collector 1.

The region on which the first active material layer 4 is disposed, which is a region of a major surface of the first current collector 3, is an example of the "first region" in the present disclosure. The region on which the first thermal-expandable layer 6 is disposed, which is a region of the major surface of the first current collector 3, is an example of the "second region" in the present disclosure.

As illustrated in FIG. 2, when the first thermal-expandable layer 6 thermally expands, the first thermal-expandable layer 6 increases the distance between the first current collector 3 and the second current collector 1 to separate the electrolyte layer 5 and the second active material layer 2 from each other. As a result, a gap 7 is formed between the electrolyte layer 5 and the second active material layer 2, and thus ionic conduction and heat transmission between the first electrode layer 12 and the second electrode layer 11 can be interrupted.

In the present embodiment, the electrolyte layer 5 and the second active material layer 2 can be separated from each other, and optionally, other components within the battery 100 may be separated from each other. For example, the electrolyte layer 5 and the first active material layer 4 may be separated from each other. That is, it is sufficient to interrupt heat conduction from a layer that is experiencing anomalous heat generation to other layers. Thus, the greater the number of portions that can be separated, the quicker the layer that is experiencing anomalous heat generation can be cooled and heat transmission to adjacent layers can be suppressed. Consequently, the progression of heat generation within the battery is suppressed.

In addition, as illustrated in the lower figure (b) in FIG. 1, the first thermal-expandable layer 6 is disposed around the laminate, formed of the first active material layer 4, the electrolyte layer 5, and the second active material layer 2, and is in contact with the side surfaces of the laminate. Accordingly, when anomalous heat generation occurs within the laminate, heat can be easily transmitted from the heating portion directly to the first thermal-expandable layer 6, and consequently the first thermal-expandable layer 6 can quickly respond to the anomalous heat generation.

The configuration described above, for example, suppresses anomalous heat generation in the battery due to overcharging, short-circuiting, or the like and thus suppresses the battery from catching fire or emitting smoke.

That is, with the configuration described above, when anomalous heat generation occurs in the battery 100, the first thermal-expandable layer 6 functions as follows. When the temperature of the battery 100 reaches the expansion starting temperature of the first thermal-expandable layer 6, the first thermal-expandable layer 6 expands, for example, in the lamination direction of the battery 100, as illustrated in FIG. 2, and thus the gap 7 is formed between the electrolyte layer 5 and the second active material layer 2. Here, assuming that, for example, anomalous heat generation occurs in the second active material layer 2, the heat is transmitted to the area that is in contact with the second active material layer 2, of the first thermal-expandable layer 6, and the portion corresponding to the second active material layer 2, of the first thermal-expandable layer 6, begins to thermally expand to cause the second active material layer 2 and the electrolyte layer 5 to be separated from each other. Accordingly, the first electrode layer 12 and the second electrode layer 11 are spatially and electrically disconnected from each other. That is, by separating the first electrode layer 12 and the second electrode layer 11 from each other, electrical connection is interrupted. As a result, the progression of anomalous heat generation in the battery 100 is stopped, and thus the battery 100 is suppressed from catching fire or emitting smoke.

For example, the bonding strength between the electrolyte layer 5 and the second active material layer 2 may be lower than the bonding strength between the first current collector 3 and the first active material layer 4, may be lower than the bonding strength between the second current collector 1 and the second active material layer 2, may be lower than the bonding strength between the first current collector 3 and the first thermal-expandable layer 6, and may be lower than the bonding strength between the second current collector 1 and the first thermal-expandable layer 6. For example, the bonding strength between the electrolyte layer 5 and the second active material layer 2 may be lower than or the same as the bonding strength between the electrolyte layer 5 and the first active material layer 4. The bonding strengths at the interfaces can be adjusted by, for example, changing the material, the heating condition, and/or the pressurizing condition.

In the battery 100 according to the present embodiment, the bonding strengths between components of the laminate may be adjusted through pressurized firing of laminate green sheets, which are precursors for the battery, under predetermined conditions. For example, the bonding strength between the second active material layer 2 and the electrolyte layer 5 may be set to be lower than the bonding strength between the first active material layer 4 and the electrolyte layer 5. Accordingly, when anomalous heat generation occurs in the battery, the second active material layer 2 and the electrolyte layer 5 can be separated from each other.

Configuration of Battery

Now, the components of the battery 100 will be described more specifically. The present embodiment describes an example in which the first electrode layer 12 is a positive electrode and the second electrode layer 11 is a negative electrode.

As illustrated in FIG. 1, the battery 100 according to the present embodiment includes the laminate and the first thermal-expandable layer 6. The laminate is formed of the first active material layer 4, the second active material layer 2, and the electrolyte layer 5 disposed between the first active material layer 4 and the second active material layer 2. The first thermal-expandable layer 6 is disposed around the laminate. The laminate and the first thermal-expandable layer 6 are held between the first current collector 3 and the second current collector 1.

First, the components of the laminate will be described.

The first active material layer 4 may be a positive electrode active material layer. The positive electrode active material layer includes at least a positive electrode active material. A positive electrode active material is a material in which metal ions, such as lithium (Li) ions or magnesium (Mg) ions, can be inserted into and removed from the crystal structure at an electric potential higher than the electric potential of the negative electrode, and accordingly the positive electrode active material enables oxidation and reduction to occur. The type of positive electrode active material can be selected appropriately in accordance with the type of battery and may be a known positive electrode active material. The positive electrode active material may be a compound containing lithium and a transition metal element. Examples of such a compound include an oxide containing lithium and a transition metal element and a phosphoric acid compound containing lithium and a transition metal element. The oxide containing lithium and a transition metal element may be, for example, a layered oxide, examples of which include lithium-nickel composite oxides, such as $LiNi_xM_{1-x}O_2$ (where M is at least one element selected from Co, Al, Mn, V, Cr, Mg, Ca, Ti, Zr, Nb, Mo, and W, and x satisfies 0<x≤1), lithium cobalt oxides ($LiCoO_2$), lithium nickel oxides ($LiNiO_2$), and lithium manganese oxides ($LiMn_2O_4$). Other examples of the oxide containing lithium and a transition metal element include lithium manganese oxides having a spinel structure ($LiMn_2O_4$, $Li_2MnO_3$, $LiMnO_2$). The phosphoric acid compound containing lithium and a transition metal element may be, for example, a lithium iron phosphate ($LiFePO_4$) having an olivine structure. Another example of the positive electrode active material may be sulfur (S) or a sulfide such as lithium sulfide ($Li_2S$). In such a case, the positive electrode active material may be positive electrode active material particles that are coated with lithium niobate ($LiNbO_3$) or to which lithium niobate is added. One of the positive electrode active materials may be used alone or two or more of the materials may be used in combination.

As described above, it is sufficient that the first active material layer 4 include at least a positive electrode active material. Optionally, the first active material layer 4 may be a mixture layer formed of a mixture material including one or more additional materials. Examples of such additional materials include solid electrolytes such as inorganic solid electrolytes, electroconductive agents such as acetylene black, binders for binding such as polyethylene oxide and polyvinylidene fluoride. When the first active material layer 4, which is a positive electrode active material layer, is obtained by mixing together a positive electrode active material and one or more additional materials such as a solid electrolyte at a predetermined ratio, the lithium ionic conductivity and electron conductivity are improved in the positive electrode active material layer.

The thickness of the first active material layer 4 may be, for example, 5 μm to 300 μm.

Next, the second active material layer 2 may be a negative electrode active material layer. The negative electrode active material layer may be a layer primarily including a negative electrode material such as a negative electrode active material. A negative electrode active material is a material in which metal ions, such as lithium (Li) ions or magnesium (Mg) ions, can be inserted into and removed from the crystal structure at an electric potential lower than the electric potential of the positive electrode, and accordingly the negative electrode active material enables oxidation and reduction to occur. The type of negative electrode active material can be selected appropriately in accordance with the type of battery and may be a known negative electrode active material. Examples of the negative electrode active material include carbon materials, such as natural graphite, artificial graphite, graphitic carbon fibers, or resin-baked carbon, and alloy-based materials that are used to form a mixture material with a solid electrolyte. Examples of such alloy-based materials include lithium alloys, such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$, and $LiC_6$, oxides of lithium and a transition metal element, such as lithium titanate ($Li_4Ti_5O_{12}$), and metal oxides, such as zinc oxide (ZnO) and silicon oxide ($SiO_x$). One of the negative electrode active materials may be used alone or two or more of the materials may be used in combination.

As described above, it is sufficient that the second active material layer 2 include at least a negative electrode active material. Optionally, the second active material layer 2 may be a mixture layer formed of a mixture material including one or more additional materials. Examples of such additional materials include solid electrolytes such as inorganic solid electrolytes, electroconductive agents such as acetylene black, binders for binding such as polyethylene oxide and polyvinylidene fluoride. When the second active material layer 2, which is a negative electrode active material layer, is obtained by mixing together a negative electrode active material and one or more additional materials such as a solid electrolyte at a predetermined ratio, the lithium ionic conductivity and electron conductivity are improved in the negative electrode active material layer.

The thickness of the second active material layer 2 may be, for example, 5 μm to 300 μm.

The first active material layer 4 may be a negative electrode active material layer. In such a case, the second active material layer 2 is a positive electrode active material layer.

The electrolyte layer 5 is a solid electrolyte layer and includes at least a solid electrolyte. The solid electrolyte may be a known electrolyte for a battery having ionic conductivity and may be, for example, a solid electrolyte that transports metal ions such as Li ions and Mg ions. The solid electrolyte may be selected appropriately in accordance with the conductive ion species and may be, for example, an inorganic solid electrolyte, such as a sulfide-based solid electrolyte or an oxide-based solid electrolyte. Examples of the sulfide-based solid electrolyte include lithium-containing sulfides, which include sulfides of the $Li_2S$—$P_2S_5$ system, $Li_2S$—$SiS_2$ system, $Li_2S$—$B_2S_3$ system, $Li_2S$—$GeS_2$ system, $Li_2S$—$SiS_2$—LiI system, $Li_2S$—$SiS_2$—$Li_3PO_4$ system, $Li_2S$—$Ge_2S_2$ system, $Li_2S$—$GeS_2$—$P_2S_5$ system, and $Li_2S$—$GeS_2$—ZnS system. Examples of the oxide-based solid electrolyte include lithium-containing metal oxides, such as $Li_2O$—$SiO_2$ and $Li_2O$—$SiO_2$—$P_2O_5$, lithium-containing metal nitrides such as $Li_xP_yO_{1-z}N_z$, lithium phosphate ($Li_3PO_4$), and lithium-containing transition metal oxides such as lithium titanium oxide. The solid electrolyte may be made from one of these materials or may be made from a combination of two or more of these materials.

The electrolyte layer 5 may include, for example, a binder for binding, such as polyethylene oxide and polyvinylidene fluoride, in addition to the material of the solid electrolyte mentioned above.

The thickness of the electrolyte layer 5 may be, for example, 5 μm to 150 μm.

The material of the solid electrolyte may be in the form of particles.

Now, the first thermal-expandable layer 6 will be described. The first thermal-expandable layer 6 is a member that expands when the temperature increases and can remain electrochemically stable within the battery. In the case that the battery is overcharged or an external short circuit occurs, the first thermal-expandable layer 6 expands and interrupts electrical connection within the laminate when the temperature in the battery exceeds a predetermined temperature.

As illustrated in FIG. 1, the first thermal-expandable layer 6 is, for example, disposed around the laminate formed of the first active material layer 4, the electrolyte layer 5, and the second active material layer 2 and is held between the first current collector 3 and the second current collector 1. The first thermal-expandable layer 6 includes at least one of a thermally expandable resin and thermally expandable particles which expand when the temperature increases.

The thermally expandable resin may be a polymer, examples of which include polyamides (PA), polyimides, polyamide-imides, wholly aromatic polyamides, polyetherimides, polysulfones, polyethersulfones, polyethylene terephtalates (PET), polyetheretherketones (PEEK), polytetrafluoroethylenes (PTFE), polyvinylidene fluorides (PVDF), polypropylenes (PP), and polyethylenes (PE). One of the polymers may be used alone or a mixture of two or more of the polymers may be used. Further, the polymer may be mixed with thermally expandable particles, which will be described later.

The first thermal-expandable layer 6 may be a structure in which a plurality of thermally expandable resins are layered.

The thermally expandable particles may be thermally expandable microcapsules obtained by filling minute capsules made of a thermoplastic resin with a low-boiling point material. The material of the microcapsule, that is, the shell is not particularly limited provided that the material is electrochemically stable and exhibits strength sufficient to maintain its shape after expansion. The thermally expandable resin mentioned above may be used as the material. The thermally expandable material that fills the microcapsules is not particularly limited provided that the material does not affect the properties of the battery even if the material leaks out of the microcapsules. For example, the thermally expandable material may be a low-boiling point hydrocarbon.

The median diameter of the microcapsules, at room temperature (e.g., 25° C.), may be 1 μm or more and 100 μm or less and, for example, may be 10 μm. The low-boiling point material within the microcapsules is liquid at room temperature (e.g., 25° C.) and, when the liquid boils, the liquid vaporizes and thus causes the microcapsules to expand.

Examples of the low-boiling point material include hydrocarbons, halogenated hydrocarbons, and alkylsilanes. Examples of hydrocarbons include straight-chain alkanes having 1 to 7 carbon atoms, branched alkanes having 4 to 7 carbon atoms, cycloalkanes having 3 to 7 carbon atoms, straight-chain alkenes having 3 to 7 carbon atoms, and branched alkenes having 3 to 7 carbon atoms. The low-boiling point material may be a mixture of two or more of these hydrocarbons and may be, for example, a petroleum ether. The hydrocarbon may be, for example, at least one selected from the group consisting of isobutane, pentane, hexane, and heptane. Examples of the halogenated hydrocarbon include methyl chloride, methylene chloride, trichlorofluoromethane, and dichlorodifluoromethane. Examples of the alkylsilane include methylsilane, tetramethylsilane, and trimethylethylsilane.

The thermally expandable material may be a material that sublimes at a desired temperature. Examples of such a sublimation material include hexachloroethane, iodine-hexachloroethane, and camphor.

The thermoplastic resin may be a polymer formed by polymerizing one material selected from the group consisting of vinylidene chloride, acrylonitrile, acrylic acid esters, and methacrylic acid esters or a copolymer formed by copolymerizing two or more of these materials. The thermoplastic resin may be, for example, at least one selected from the group consisting of polyethylene, polypropylene, polyvinyl chloride, polyethylene terephthalate, silicone resin, and polytetrafluoroethylene.

The thermoplastic resin that forms the outer shell of the microcapsules is a material selected from the materials mentioned above and having a softening point at a desired temperature. The thermally expandable material that fills the microcapsules may be a material selected from the materials mentioned above and having a boiling point at a desired temperature. The thermal expansion starting temperature of the microcapsules may be determined in accordance with the softening point of the thermoplastic resin and the boiling point of the thermally expandable material. At least one of the softening point of the thermoplastic resin and the boiling point of the thermally expandable material may be set to a temperature within a range of 100° C. or higher and 300° C. or lower. For example, the softening point of the thermoplastic resin may be set to a temperature within the range of 100° C. or higher and 300° C. or lower, and the boiling point of the thermally expandable material may be set to a temperature lower than the softening point of the thermoplastic resin. In addition, the thermal expansion starting temperature may be adjusted in accordance with the diameter, the outer shell thickness, and/or the outer shell thermal conductivity of the microcapsules.

For the thermally expandable particles, the thermal expansion starting temperature of the microcapsules may be 100° C. to 300° C., 150° C. to 250° C., 200° C. or lower, or 180° C. or lower. The thermal expansion ratio may be varied in accordance with the design provided that the thermal expansion ratio enables the thickness of the first thermal-expandable layer 6 to become larger than the thickness of the laminate so that electrical connection within the laminate can be interrupted. Here, the phrase "interrupting electrical connection within the laminate" means shutting down the function of the battery, by, for example, separating the first active material layer 4 and the electrolyte layer 5 from each other. The thermal expansion ratio of the thermally expandable particles may be, for example, 1:30 to 1:80. The thermally expandable particles may be a mixture of particles having different thermal expansion ratios.

The first thermal-expandable layer 6 may be an assembly of a large number of aggregated thermally expandable particles. Alternatively, the first thermal-expandable layer 6 may be made of a composite material in which a large number of thermally expandable particles are dispersed in a flexible matrix resin. The assembly may include a plurality of types of thermally expandable particles, and the composite material may include a plurality of types of thermally expandable particles. The thermally expandable particles are not limited to hollow microcapsules and may be solid particles of a thermoplastic resin.

The temperature at which anomalous heat generation is to be suppressed, that is, the temperature at which the progression of heat generation is to be stopped may be adjusted by appropriately selecting and combining materials for the first thermal-expandable layer, such as the thermally expandable particles and the thermally expandable resin, that form the first thermal-expandable layer 6. When the thermal expansion temperature of the first thermal-expandable layer 6 is adjusted to a desired temperature, the first thermal-expandable layer 6 can expand to interrupt electrical current before the battery catches fire or emits smoke as a result of anomalous heat generation. The first thermal-expandable layer 6 may be made of one of the above-mentioned materials for the first thermal-expandable layer or may be made of a combination of two or more of the materials.

The first thermal-expandable layer 6 may include a material that undergoes phase transition at a desired transition temperature. In such a case, a material that enables the thermal expansion ratio of the first thermal-expandable layer 6 at a temperature higher than the transition temperature to be greater than the thermal expansion ratio of the first thermal-expandable layer 6 at a temperature lower than the transition temperature is selected. The transition temperature may be, for example, a boiling point or a sublimation temperature. With this configuration, a rapid volume expansion is achieved when the temperature exceeds the transition temperature. The phase transition material may, for example, fill the microcapsules described above. The transition temperature may be set in accordance with the heat resistance guaranteed temperature of the battery and may be, for example, set to a temperature within a range of 100° C. or higher and 300° C. or lower.

Further, the first thermal-expandable layer 6 may include a binder for binding, such as polyethylene oxide and polyvinylidene fluoride, in addition to the thermally expandable particles.

To promote rapid and uniform thermal conduction within the first thermal-expandable layer 6 to electrically separate the first active material layer 4 and the second active material layer 2 from each other, the first thermal-expandable layer 6 may include a high-thermal conductivity material to an extent that does not adversely affect the battery characteristics. Examples of the high-thermal conductivity material include a powder of a highly insulating material, such as alumina oxide or aluminum nitride. Another example of the high-thermal conductivity material may be a thermally expandable resin, such as an epoxy-based resin.

When the configuration disclosed in the present disclosure is compared with the configurations disclosed in Japanese Unexamined Patent Application Publication No. 2016-126901, U.S. Patent Application Publication No. 2008/254355A1, and U.S. Patent Application Publication No. 2015/118553A1, the following differences are noted.

In Japanese Unexamined Patent Application Publication No. 2016-126901, a resin coating layer including a thermally expandable resin is formed on the bottom surface of the non-contact recessed portion. The resin coating layer is disposed between the positive electrode current collector and the negative electrode current collector and is in contact with the positive electrode current collector. The resin coating layer, however, is not in contact with the negative electrode current collector. Furthermore, there is no disclosure that the resin coating layer separates the separator and the negative electrode active material layer from each other.

Furthermore, in U.S. Patent Application Publication No. 2008/254355A1 and U.S. Patent Application Publication No. 2015/118553A1, expandable members including a thermally expandable material are each included in the positive electrode and in the negative electrode.

Furthermore, the shape and the placement position of the thermally expandable members in the configurations described in Japanese Unexamined Patent Application Publication No. 2016-126901, U.S. Patent Application Publication No. 2008/254355A1, and U.S. Patent Application Publication No. 2015/118553A1 are different from those in the configuration of the present disclosure. Thus, the following problems may arise.

In the configuration of Japanese Unexamined Patent Application Publication No. 2016-126901, the non-contact recessed portion of the current collector reduces the area of contact between the positive electrode active material layer and the current collector, and thus some of the active material particles inevitably do not serve as an electroconductive path. Thus, the configuration of Japanese Unexamined Patent Application Publication No. 2016-126901 poses a problem of a reduction in the battery capacity and an increase in loss.

In U.S. Patent Application Publication No. 2008/254355A1, the thermally expandable members are each disposed between the current collector and the active material layer. It is preferable that expandable members be made of a material having expanding characteristics and high electroconductivity. In U.S. Patent Application Publication No. 2008/254355A1, however, the expandable members are made of expandable graphite. The electroconductivity of expandable graphite is approximately ten thousand to one hundred thousand times lower than the electroconductivity of the metal foil of the current collector. When graphite expands, the electroconductive path is extended and thus the resistance increases. Thus, the configuration of U.S. Patent Application Publication No. 2008/254355A1 poses a problem in that the resistance of the battery increases, which results in an increase in loss.

In U.S. Patent Application Publication No. 2015/118553A1, the current collector includes a conductive substrate and a resin layer having conductivity disposed on at least one side of the conductive substrate. In the resin layer, thermoplastic resin particles are dispersed in a thermosetting resin base material including a conductive agent. In U.S. Patent Application Publication No. 2015/118553A1, similarly to U.S. Patent Application Publication No. 2008/254355A1, the electroconductivity of the thermally expandable resin layer is low. Thus, the configuration of U.S. Patent Application Publication No. 2015/118553A1 poses a problem in that the resistance of the battery increases, which results in an increase in loss.

In contrast, the configuration of the present disclosure in which "the first thermal-expandable layer is disposed between the first current collector and the second current collector and is in contact with the first current collector and the second current collector" does not pose the problems described above. None of Japanese Unexamined Patent Application Publication No. 2016-126901, U.S. Patent Application Publication No. 2008/254355A1, and U.S. Patent Application Publication No. 2015/118553A1 disclose or suggest such a configuration as disclosed in the present disclosure.

The first current collector and the second current collector (hereinafter sometimes simply referred to as "current collector") are not particularly limited provided that the current collectors are formed of a material having electroconductivity. The current collector may be in the form of, for example, a foil, a plate, or a mesh that may be made from, for example, stainless steel, nickel, aluminum, iron, titanium, copper, palladium, gold, or platinum, or, made from an alloy or the like including two or more of the materials mentioned. The material of the current collector may be selected based on the condition that the material neither melts nor decomposes under the firing conditions, which will be described later, and in consideration of the battery operating potential to be applied to the current collector and the electroconductivity.

The material of the current collector may be selected in accordance with the required tensile strength and thermal resistance. The tensile strength of the current collector may be set, for example, to be sufficient to withstand stress applied to the current collector when the first thermal-expandable layer thermally expands. The tensile strength of the current collector may be set to, for example, 300 MPa or more. Examples of the material of the current collector include copper, aluminum, and alloys primarily made of copper and/or aluminum. The current collector may be made of a high-strength electrolytic copper foil or a clad material in which dissimilar metal foils are layered. These materials do not tend to exhibit reduced strength even in the temperature range within which the first thermal-expandable layer thermally expands. The thickness of the current collector is within a range of 10 µm or more and 100 µm or less, for example.

Overview of Stacked Battery

Next, a stacked battery according to the present embodiment will be described.

Figure 3:
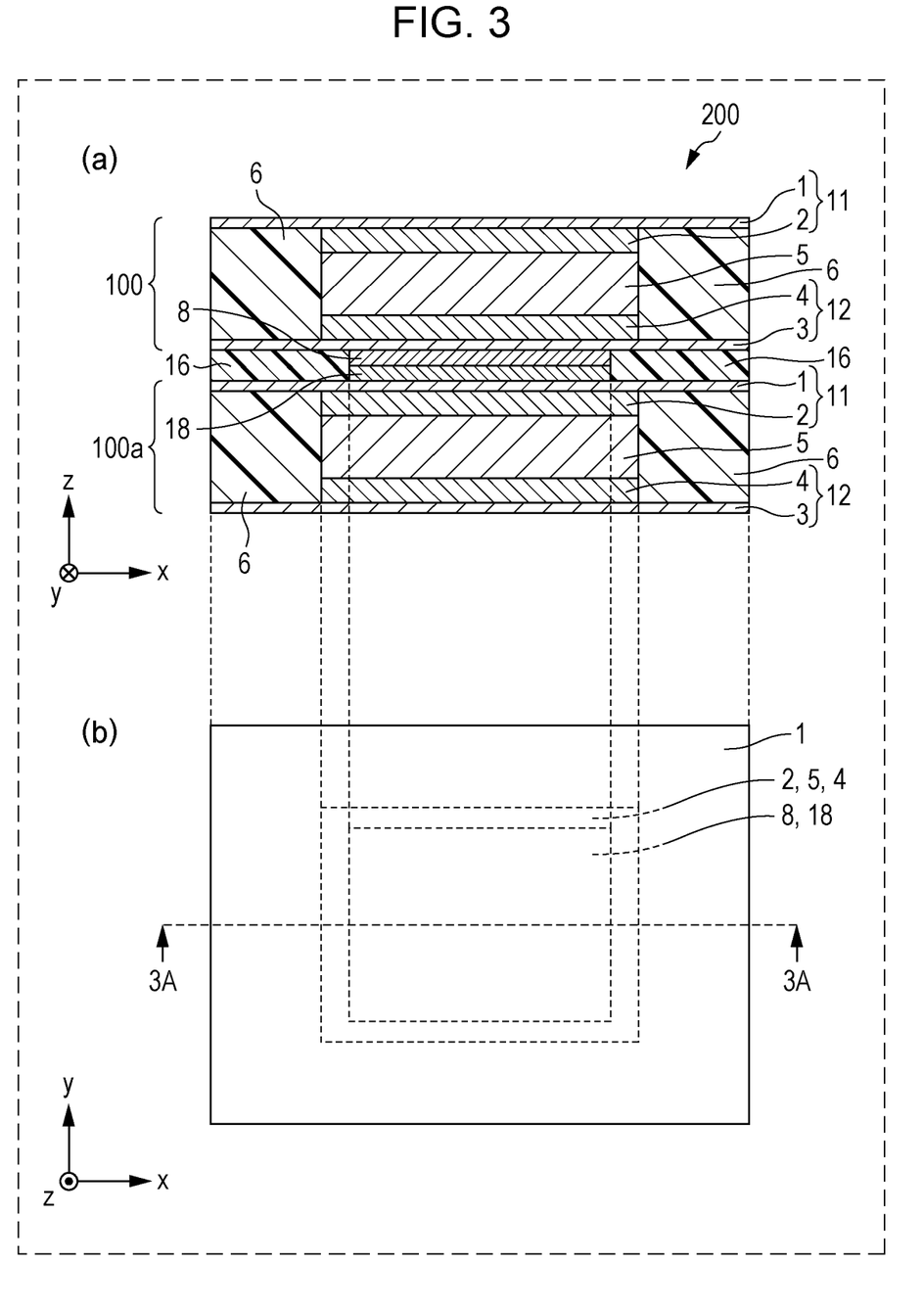
FIG. 3 is a diagram illustrating a configuration of a stacked battery according to an embodiment.
Figure 4:
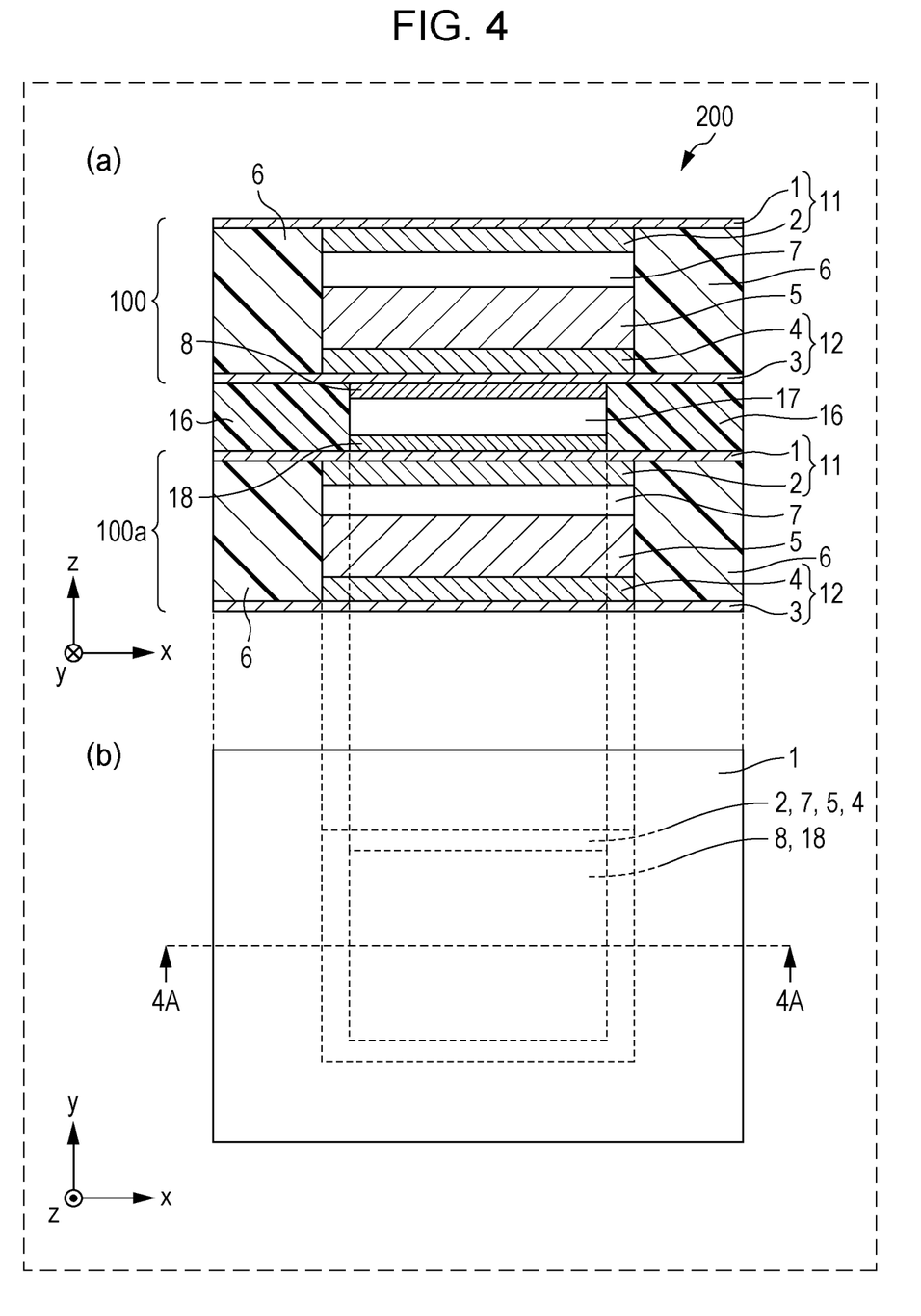
FIG. 4 is a diagram illustrating a change that occurs when the stacked battery according to the embodiment generates heat.

FIG. 3 is a diagram illustrating a configuration of a stacked battery according to an embodiment. FIG. 4 is a diagram illustrating a change that occurs when the stacked battery according to the embodiment generates heat. Descriptions redundant with those of the above-described battery will be omitted where appropriate.

As illustrated in FIG. 3, a stacked battery 200, according to the present embodiment, includes a first battery 100, which is the battery described above, a second battery 100a, and a second thermal-expandable layer 16, which is disposed between the first battery 100 and the second battery 100a.

In the present embodiment, the first battery 100 and the second battery 100a are disposed in such a manner that an electrode terminal 8 of the first battery 100 and an electrode terminal 18 of the second battery 100a are in contact with each other.

The stacked battery 200 is an example of the "battery stack" in the present disclosure. The first battery 100 and the second battery 100a are examples of the "first battery cell" and the "second battery cell", respectively, in the present disclosure. The electrode terminal 8 and the electrode terminal 18 are examples of the "first electroconductive layer" and the "second electroconductive layer", respectively, in the present disclosure. The laminate of the electrode terminal 8 and the electrode terminal 18 is an example of the "electroconductive interlayer" in the present disclosure. The second thermal-expandable layer 16 is an example of the "thermal-expandable interlayer" in the present disclosure. The region on which the electrode terminal 8 is disposed, which is a region of the bottom surface of the first current collector 3 of the first battery 100, is an example of the "third region" in the present disclosure. The region on which the second thermal-expandable layer 16 is disposed, which is a region of the bottom surface of the first current collector 3 of the first battery 100, is an example of the "fourth region" in the present disclosure.

As illustrated in FIG. 4, when the second thermal-expandable layer 16 thermally expands, the second thermal-expandable layer 6 increases the distance between the first battery 100 and the second battery 100a to separate the first battery 100 and the second battery 100a from each other. That is, the distance between the electrode terminal 8 of the first battery 100 and the electrode terminal 18 of the second battery 100a is increased to separate the electrode terminal 8 of the first battery 100 and the electrode terminal 18 of the second battery 100a from each other.

The configuration described above suppresses anomalous heat generation in the battery due to, for example, overcharging or short-circuiting and thus suppresses a battery adjacent to the battery experiencing anomalous heat generation from catching fire. Thus, the stacked battery is suppressed from catching fire or emitting smoke.

As illustrated in the upper figure (a) in FIG. 3, the first battery 100 and the second battery 100a are electrically connected together in series and in contact with each other via the electroconductive electrode terminals 8 and 18. In addition, the first current collector 3 and the second current collector 1 are each in contact with the second thermal-expandable layer 16, at regions excluding the electrode terminals 8 and 18, and thus the first battery 100 and the second battery 100a are integrated together to form the stacked battery 200.

As illustrated in the lower figure (b) in FIG. 3, in the stacked battery 200, when anomalous heat generation occurs in at least one of the first battery 100 and the second battery 100a, the second thermal-expandable layer 16 thermally expands to form a gap 17 between the electrode terminal 8 and the electrode terminal 18. Thus, as a result of thermal expansion of the second thermal-expandable layer 16, the distance between the first battery 100 and the second battery 100a is increased and accordingly the first battery 100 and the second battery 100a are separated from each other.

As a result, the first battery 100 and the second battery 100a are electrically separated from each other. That is, in the case that, during an operation of the stacked battery in which the plurality of batteries are connected together in series, anomalous heat generation occurs in one of the batteries and the temperature increases, the electrical current is interrupted by separating the first battery 100 and the second battery 100a, which are batteries adjacent to each other, from each other. This suppresses the heat generation in the battery from progressing, which suppresses the battery from catching fire or emitting smoke and suppresses a battery adjacent to the battery experiencing heat generation from catching fire.

The electrode terminals 8 and 18 are formed by printing an electroconductive paste containing metal particles of silver or copper by using a metal mask and drying the paste. In the case that the electrode terminals 8 and 18 are metal terminals, the current collectors may be bonded to the electrode terminals 8 and 18 via an electroconductive adhesive or electroconductive tape. The electrode terminals 8 and 18 may be formed by masking the current collectors and thermal-spraying aluminum onto the current collectors.

It should be noted that the components of the battery and the stacked battery described above may be appropriately combined with one another.

Method for Manufacturing Battery

An example of the method for manufacturing the battery according to the present embodiment will be described. The method for manufacturing the battery according to the present embodiment includes a green sheet production step and a firing step.

In the green sheet production step, a green sheet in which the components of the battery according to the present embodiment are laminated (hereinafter referred to as laminate green sheet) is produced. The laminate green sheet is obtained by forming, over a first current collector, a first active material layer green sheet, an electrolyte layer green sheet, a second active material layer green sheet, and a second current collector in the order stated. The order of forming is not limited to the order mentioned. The present embodiment describes an example in which the first electrode layer 12 is a positive electrode and the second electrode layer 11 is a negative electrode.

First, the green sheet production step will be described. The green sheet production step is a step in which the green sheets, which are precursors for the components of the battery, are produced and laminated together.

A first electrode layer green sheet includes the first current collector and the first active material layer green sheet formed on the first current collector. The first active material layer green sheet is formed by obtaining a first active material layer slurry by mixing a binder containing a positive electrode active material, a solid electrolyte, and an electroconductive agent with a solvent, then coating or printing the first active material layer slurry onto the first current collector, and thereafter drying the slurry.

Specifically, the first current collector is a copper foil of approximately 30 μm thickness. The positive electrode active material is a powder of a Li.Ni.Co.Al complex oxide (LiNi$_{0.8}$Co$_{0.15}$Al$_{0.05}$O$_2$) having a layered structure. The average particle diameter of the powder is approximately 5 μm. The material of the solid electrolyte is a Li$_2$S—P$_2$S$_5$ system sulfide glass powder primarily formed of a triclinic crystal system. The average particle diameter of the powder is approximately 10 μm. The material of the solid electrolyte may be, for example, a material having a high ionic conductivity, namely, 2×10$^{-3}$ S/cm to 3×10$^{-3}$ S/cm.

The first active material layer slurry is printed onto one surface of the copper foil serving as the first current collector, by, for example, a screen printing method so that the slurry can be formed into a predetermined shape and the thickness thereof can be approximately 50 μm to 100 μm. Thereafter, drying is performed at 80° C. to 130° C. Thus, the resultant first active material layer green sheet has a thickness of 30 μm to 60 μm.

A second electrode layer green sheet includes the second current collector and the second active material layer green sheet formed on the second current collector. The second active material layer green sheet is formed by obtaining a second active material layer slurry by mixing a binder containing a negative electrode active material, a solid electrolyte, and an electroconductive agent with a solvent, then coating or printing the second active material layer slurry onto the second current collector, and thereafter drying the slurry.

Specifically, the second current collector is a copper foil of approximately 30 μm thickness. The negative electrode active material is a natural graphite powder having an average particle diameter of approximately 10 μm. The material of the solid electrolyte is the same as the material of the solid electrolyte used in the first electrode layer green sheet described above.

The second active material layer slurry is printed onto one surface of the copper foil serving as the second current collector, by, for example, a screen printing method so that the slurry can be formed into a predetermined shape and the thickness thereof can be approximately 50 μm to 100 μm. Thereafter, drying is performed at 80° C. to 130° C. Thus, the resultant second active material layer green sheet has a thickness of 30 μm to 60 μm.

The electrolyte layer green sheet is disposed between the first active material layer green sheet and the second active material layer green sheet. The electrolyte layer slurry is prepared by mixing a binder containing the above-described material of the solid electrolyte and an electroconductive agent with a solvent. The electrolyte layer slurry is printed onto a surface, opposite to the first current collector, of the first active material layer green sheet by using a metal mask so that the thickness of the slurry can be approximately 100 μm. Thereafter, drying is performed at 80° C. to 130° C. Likewise, the electrolyte layer slurry is printed onto a surface, opposite to the second current collector, of the second active material layer green sheet by using a metal mask so that the thickness of the slurry can be approximately 100 μm. Thereafter, drying is performed at 80° C. to 130° C. Thus, the electrolyte layer green sheet is formed on the first electrode layer green sheet and on the second electrode layer green sheet.

The method for producing the electrolyte layer green sheet is not limited to the method described above. The electrolyte layer green sheet may be formed by coating or printing an electrolyte layer slurry onto a base material and thereafter drying the slurry. The base material is not particularly limited provided that the electrolyte layer green sheet can be formed thereon. For example, the base material may be a material in a film form such as a Teflon (registered trademark) or polyethylene terephthalate (PET) film or a material in a foil form. By peeling away the base material after drying the electrolyte layer slurry, the electrolyte layer green sheet can be obtained.

The solvent used for the first electrode layer slurry, the second electrode layer slurry, and the electrolyte layer slurry is not particularly limited provided that the binder described above can be dissolved in the solvent. The solvent may be an organic solvent or water. Examples of the organic solvent include alcohols, such as ethanol, isopropanol, and n-butanol, toluene, ethyl acetate, butyl acetate, acetone, methyl ethyl ketone, methyl isobutyl ketone, ethylene glycol ethyl ether, isophorone, butyl lactate, dioctyl phthalate, dioctyl adipate, benzyl alcohol, N,N-dimethylformamide (DMF), and N-methyl-2-pyrrolidone (NMP). One of these solvents may be used alone or two or more of these solvents may be used in combination.

The first thermal-expandable layer 6 includes thermally expandable particles having an average particle diameter of approximately 10 μm. Specifically, thermally expandable microspheres are used. The thermally expandable microspheres are formed of minute capsules made of a thermoplastic resin and a low-boiling point material filling the capsules. The low-boiling point material may be a hydrocarbon, for example. The thermally expandable microspheres used have a thermal expansion starting temperature of 200° C. and a thermal expansion ratio of 1:50.

The paste for the first thermal-expandable layer is prepared by mixing thermally expandable particles and a binder with a solvent. The paste for the first thermal-expandable layer is printed onto the first electrode layer green sheet and the second electrode layer green sheet, except for the regions on which the electrolyte layer green sheets are formed, by using a metal mask so that the first thermal-expandable layer 6 can be formed in a predetermined shape. The paste for the first thermal-expandable layer is printed onto the first electrode layer green sheet and onto the second electrode layer green sheet, each to a thickness of approximately 100 μm to approximately 150 μm, and thereafter the paste is dried at 80° C. to 130° C. As a result of this, the first thermal-expandable layer prior to firing, that is, the precursor for the first thermal-expandable layer has a thickness of 80 μm to 120 μm. Thus, the precursor for the first thermal-expandable layer is formed on the first electrode layer green sheet and on the second electrode layer green sheet, to a thickness equivalent to the thickness of the electrolyte layer green sheets.

As stated in the section "Configuration of Battery", the first thermal-expandable layer 6 includes at least one of a thermally expandable resin and thermally expandable particles which expand when the temperature increases. Thus, the first thermal-expandable layer 6 may include, for example, a thermally expandable resin such as an epoxy-based resin, in addition to particulate thermally expandable particles. In the first thermal-expandable layer 6, a thermally expandable resin alone may be included as the material of the first thermal-expandable layer without including thermally expandable particles. A plurality of materials having different expansion starting temperatures may be combined to form the first thermal-expandable layer 6. This makes it possible to set, for the first thermal-expandable layer 6, the thermal expansion starting temperature for the first thermal-expandable layer appropriately, in accordance with the temperature increase associated with anomalous heat generation in the battery. This efficiently suppresses anomalous heat generation in the battery and thus suppresses the battery from catching fire or emitting smoke.

Lastly, the surface on which the electrolyte layer green sheet is formed, of the first electrode layer green sheet, and the surface on which the electrolyte layer green sheet is formed, of the second electrode layer green sheet, are overlaid onto each other. Thus, a laminate green sheet is produced.

Next, the firing step will be described. In the firing step, the laminate green sheet obtained in the green sheet production step is fired under predetermined conditions to degrease the binder included in the green sheet and thus enhance binding between the material particles included in each of the components.

The laminate green sheet obtained in the green sheet production step is placed into a rectangular die. Next, an elastic sheet (70 μm thickness) having a modulus of elasticity of approximately $5\times10^6$ Pa is inserted between the pressure die punch and the laminate green sheet. This is pressurized at 300 MPa for 90 seconds while being heated to 50° C. Thus, the battery 100 according to the present embodiment is obtained.

In the present embodiment, in the example described above, the first active material layer slurry, the second active material layer slurry, and the electrolyte layer slurry are printed by screen printing. However, this is a non-limiting example. Examples of methods for printing that may be used include doctor blade methods, calendar methods, spin coating methods, dip coating methods, ink jet methods, offset methods, die coating methods, and spraying methods.

The first active material layer slurry, the second active material layer slurry, and the electrolyte layer slurry can be prepared by mixing, for example, a firing agent as necessary, in addition to the positive or negative electrode active material, the solid electrolyte, the electroconductive agent, the binder, and the solvent described above. The method for mixing the slurry is not particularly limited. As necessary, one or more additives, such as a thickening agent, a plasticizing agent, an antifoam agent, a leveling agent, and a tackifying agent, may be added to the slurry.

Method for Manufacturing Stacked Battery

An example of the method for manufacturing the stacked battery according to the present embodiment will be described. The method for manufacturing the stacked battery according to the present embodiment includes an electrode terminal forming step, a second thermal-expandable layer forming step, and a firing step. In the electrode terminal forming step, a plurality of, for example, two, batteries obtained by the manufacturing method described above are provided, and electrode terminals for connecting the batteries together are formed. In the second thermal-expandable layer forming step, the second thermal-expandable layer 16 is formed between the batteries.

The present embodiment describes a stacked battery in which batteries obtained by the above-described method for manufacturing the battery serve as the first battery 100 and the second battery 100a and these batteries are connected together in series, as illustrated in FIGS. 3 and 4. The method for manufacturing the first battery 100 and the second battery 100a are as described above, and thus a description thereof is omitted here.

In the electrode terminal forming step, precursors for the electrode terminals 8 and 18 are formed on the surfaces of the current collectors, the surfaces being the ones at which the first battery 100 and the second battery 100a are connected to each other in series. As illustrated in FIG. 3, the electrode terminal 8 is formed by printing an electroconductive paste onto a surface facing the second battery 100a, of the first current collector 3 of the first battery 100 by using a metal mask so that the paste can be formed into a predetermined shape and then drying the paste. Likewise, the electrode terminal 18 is formed on a surface facing the first battery 100, of the second current collector 1 of the second battery 100a.

Specifically, the electroconductive paste is printed onto the surface of the current collector to a thickness of approximately 100 μm to 150 μm and thereafter dried at 80° C. to 130° C. As a result of this, the electrode terminals prior to firing, that is, the precursors for the electrode terminals have a thickness of 80 μm to 120 μm.

In the second thermal-expandable layer forming step, a precursor for the second thermal-expandable layer 16 is formed between the first battery 100 and the second battery 100a. The paste for the second thermal-expandable layer may have the same composition as the paste for the first thermal-expandable layer or may have a different composition. The paste for the second thermal-expandable layer is printed onto the first current collector 3 of the first battery 100 and the second current collector 1 of the second battery 100a, except for the regions on which the precursor for the electrode terminal 8 and the precursor for the electrode terminal 18 are formed, by using a metal mask so that the second thermal-expandable layer 16 can be formed in a predetermined shape. The paste for the second thermal-expandable layer is printed onto the first current collector 3 of the first battery 100 and onto the second current collector 1 of the second battery 100a, each to a thickness of approximately 100 μm to approximately 150 μm, and thereafter the paste is dried at 80° C. to 130° C. As a result of this, the second thermal-expandable layer prior to firing, that is, the precursor for the second thermal-expandable layer has a thickness of 80 μm to 120 μm. Thus, the precursor for the second thermal-expandable layer 16 is formed on the first battery 100 and on the second battery 100a, to a thickness equivalent to the thickness of the precursors for the electrode terminals 8 and 18.

Next, in the firing step, the first battery 100 and the second battery 100a are overlaid onto each other in such a manner that the precursor for the electrode terminal 8 and the precursor for the electrode terminal 18 are in contact with each other, and thereafter the resultant is pressurized at 200 MPa for 90 seconds while being heated to 50° C. Thus, the first battery 100 and the second battery 100a are integrated together to provide the stacked battery 200 according to the present embodiment.

In the foregoing descriptions, the battery and the stacked battery according to the present disclosure have been described based on the embodiments, but the present disclosure is not limited to these embodiments. Embodiments in which any of various modifications conceived by one skilled in the art is made to the embodiment and other embodiments formed by combining some of the constituent components of the embodiment together are included in the scope of the present disclosure without departing from the essence of the present disclosure.

What is claimed is:

1. A battery comprising:
   a first current collector having a surface;
   a laminate disposed on a first region of the surface of the first current collector, the laminate including
      a first active material layer disposed on the first region,
      an electrolyte layer disposed on the first active material layer, and
      a second active material layer disposed on the electrolyte layer;
   a thermal-expandable layer disposed on a second region of the surface of the first current collector, a thermal expansion ratio of the thermal-expandable layer being greater than a thermal expansion ratio of the laminate, wherein the thermal-expandable layer is configured to expand in response to excessive heat; and
   a second current collector disposed on both of the laminate and the thermal-expandable layer.

2. The battery according to claim 1, wherein
the first current collector is in contact with the first active material layer,
the second current collector is in contact with the second active material layer,
the electrolyte layer is in contact with the second active material layer, and
a bonding strength between the electrolyte layer and the second active material layer is lower than a bonding strength between the first current collector and the first active material layer and lower than a bonding strength between the second current collector and the second active material layer.

3. The battery according to claim 1, wherein
under a condition that a temperature exceeds a specific value, the thermal-expandable layer thermally expands to increase a distance between the first current collector and the second current collector to peel the electrolyte layer and the second active material layer away from each other.

4. The battery according to claim 1, wherein
the thermal-expandable layer includes a material that undergoes phase transition at a transition temperature, and
a thermal expansion ratio of the thermal-expandable layer at a temperature higher than the transition temperature is greater than a thermal expansion ratio of the thermal-expandable layer at a temperature lower than the transition temperature.

5. The battery according to claim 4, wherein
the transition temperature is a boiling point or a sublimation temperature.

6. The battery according to claim 4, wherein
the thermal-expandable layer includes a plurality of microcapsules filled with the material.

7. The battery according to claim 6, wherein
each of the plurality of microcapsules includes an outer shell made of a thermoplastic resin.

8. The battery according to claim 7, wherein
at least one of the transition temperature of the material and a softening point of the thermoplastic resin is within a range of 100° C. or higher and 300° C. or lower.

9. The battery according to claim 1, wherein
the first current collector and the second current collector are each in contact with the thermal-expandable layer,
the electrolyte layer is in contact with the second active material layer, and
a bonding strength between the electrolyte layer and the second active material layer is lower than a bonding strength between the first current collector and the thermal-expandable layer and lower than a bonding strength between the second current collector and the thermal-expandable layer.

10. The battery according to claim 1, wherein
the second region has a ring shape surrounding the first region.

11. The battery according to claim 1, wherein
the thermal-expandable layer is in contact with the laminate.

12. A battery stack comprising:
a first battery cell comprising the battery according to claim 1;
a second battery cell; and
an interlayer disposed between the first battery cell and the second battery cell, the interlayer including
an electroconductive interlayer disposed on a third region of a second surface of the first current collector and electrically connecting the first battery cell to the second battery cell, and
a thermal-expandable interlayer disposed on a fourth region of the second surface of the first current collector,
wherein a thermal expansion ratio of the thermal-expandable interlayer is greater than a thermal expansion ratio of the electroconductive interlayer.

13. The battery stack according to claim 12, wherein under a condition that a temperature exceeds a specific value, the thermal-expandable interlayer thermally expands to increase a distance between the first battery cell and the second battery cell to insulate the first battery cell and the second battery cell from each other.

14. The battery stack according to claim 12, wherein the fourth region has a ring shape surrounding the third region.

15. The battery stack according to claim 12, wherein the electroconductive layer includes a first electroconductive layer disposed on the first battery cell and a second electroconductive layer disposed on the second battery cell,
the first electroconductive layer is in contact with the second electroconductive layer,
the first battery cell is in contact with the first electroconductive layer,
the second battery cell is in contact with the second electroconductive layer, and
a bonding strength between the first electroconductive layer and the second electroconductive layer is lower than a bonding strength between the first battery cell and the first electroconductive layer and lower than a bonding strength between the second battery cell and the second electroconductive layer.

* * * * *